United States Patent [19]

Macedo et al.

[11] Patent Number: 4,591,455
[45] Date of Patent: May 27, 1986

[54] PURIFICATION OF CONTAMINATED LIQUID

[75] Inventors: Pedro B. Macedo, 6100 Highboro Dr., Bethesda, Md. 20817; Herbert G. Sutter, Gaithersburg, Md.; Robert K. Mohr, Washington, D.C.; Catherine J. Simmons, Bethesda, Md.

[73] Assignees: Pedro B. Macedo, Bethesda; Theodore A. Litovitz, Annapolis, both of Md.

[21] Appl. No.: 444,176
[22] Filed: Nov. 24, 1982
[51] Int. Cl.[4] .................................. G21F 9/16
[52] U.S. Cl. .................................. 252/629; 252/628; 501/11; 501/12; 501/54; 501/60; 501/61; 501/63; 501/64; 501/65; 502/232; 502/405; 502/407; 502/411
[58] Field of Search ............... 252/631, 633, 628, 629, 252/626; 501/54, 55, 60, 61, 62, 63, 64, 65, 12, 39, 11; 502/232, 405, 407, 411

[56] References Cited

U.S. PATENT DOCUMENTS

| | | | |
|---|---|---|---|
| 2,717,696 | 9/1955 | Schubert | 210/42.5 |
| 2,855,269 | 10/1958 | Boyd et al. | 23/14.5 |
| 2,859,093 | 11/1958 | Russell et al. | 23/14.5 |
| 3,093,593 | 6/1963 | Arrance | 252/301.1 |
| 3,101,998 | 8/1963 | Milliken, Jr. et al. | 23/25 |
| 3,167,504 | 1/1965 | Hayden, Jr. et al. | 210/24 |
| 3,243,380 | 3/1966 | Conn | 252/631 |
| 3,274,784 | 9/1966 | Shock et al. | 61/36 |
| 3,329,481 | 7/1967 | Young | 23/111 |
| 3,337,737 | 8/1967 | Eberhardt | 250/207 |
| 3,338,034 | 8/1967 | Hemstreet | 55/269 |
| 3,428,568 | 2/1969 | Harker et al. | 252/631 |
| 3,451,940 | 6/1969 | Stukenbroeker et al. | 252/301.1 |
| 3,522,187 | 7/1970 | Kraus | 252/182 |
| 3,722,181 | 3/1973 | Kirkland et al. | 55/67 |
| 3,849,330 | 11/1974 | Isaacson et al. | 252/301.1 |
| 3,901,818 | 8/1975 | Durand et al. | 252/184 |
| 3,925,992 | 12/1975 | Backstrom | 61/5 |
| 3,959,172 | 5/1976 | Brownell et al. | 252/301.1 |
| 3,983,299 | 9/1976 | Regnier | 428/405 |
| 3,997,249 | 12/1976 | Krohn et al. | 351/166 |
| 4,107,044 | 8/1978 | Levendusky | 252/631 |
| 4,178,270 | 12/1979 | Fujita et al. | 252/631 |
| 4,234,449 | 11/1980 | Wolson et al. | 252/631 |
| 4,297,304 | 10/1981 | Scheffler et al. | 264/0.5 |
| 4,312,774 | 1/1982 | Macedo et al. | 252/629 |
| 4,333,847 | 6/1982 | Tran et al. | 252/633 |
| 4,333,897 | 6/1982 | Hayashi et al. | 264/40.6 |
| 4,354,954 | 10/1982 | Koster et al. | 252/629 |
| 4,362,659 | 12/1982 | Macedo et al. | 252/629 |
| 4,394,269 | 7/1983 | Tallent et al. | 210/690 |
| 4,430,276 | 2/1984 | Radford et al. | 252/640 |

FOREIGN PATENT DOCUMENTS

| | | | |
|---|---|---|---|
| 3007716 | 9/1981 | Fed. Rep. of Germany | 252/631 |
| 0117341 | 7/1982 | Japan | 252/631 |

OTHER PUBLICATIONS

Electric Power Research Institute Report No. EPRI NP-1087 SIA 78-414, "Nuclear Waste Management Status and Recent Accomplishments", May 1979.

Primary Examiner—Stephen J. Lechert, Jr.
Assistant Examiner—Howard J. Locker
Attorney, Agent, or Firm—Fleit, Jacobson, Cohn & Price

[57] ABSTRACT

A liquid containing radioactive ions is purified (decontaminated) by contacting the same with an inorganic ion exchange composition having ion exchange sites which can be occupied by the radioactive ions from the liquid. The ion exchange composition is a mixture of an ion exchange medium and an additive which is relatively inert to the ion exchange process and which is a sintering aid for the ion exchange medium designed to lower the sintering temperature of the ion exchange composition. The ion exchange composition may be disposed within a suitable container (e.g., cannister), e.g., made of 304L stainless steel or Inconel 601 and the ion exchange process may be carried out in such container. Alternatively, the ion exchange medium can be employed without being previously admixed with the additive. The additive, if desired, can be admixed at a later stage with the contaminated medium. Thereafter, the mixture may be sintered and disposed of in any desirable manner as by underground burial of the spent mixture within the container. Also, the container may be placed within a suitably designed furnace for carrying out the ion exchange process, sintering of the ion exchange composition and its safe disposal. Methods are also described for making a homogeneous mixture of the ion exchange medium and the additive which, for example, have a certain defined density and particle size relationship.

12 Claims, 4 Drawing Figures

PURIFICATION OF CONTAMINATED LIQUID

FIELD OF INVENTION

This invention relates generally to the removal of radioactive ions from liquids containing the same.

In one aspect, the invention relates to compositions having ion exchange capacity useful, for example, in the removal of radioactive ions from liquids containing the same.

In another aspect, the invention relates to methods of making such compositions.

In still another aspect, this invention is concerned with a method of removal of radioactive ions from a liquid containing same using the relatively low melting mixtures comprising ion-exchange inorganic ion-exchange media.

In yet another aspect, this invention relates to a novel and unique apparatus designed for carrying out the decontamination ion exchange process described herein, which process includes the step of sintering the resulting contaminated low melting inorganic ion exchange media within the apparatus.

Other aspects of the invention will become apparent from the ensuing detailed description of the invention.

BACKGROUND OF THE INVENTION

Disposal of radioactive wastes has become an increasingly difficult task presenting serious impediments to the development and utilization of nuclear power facilities as an alternate source of energy. Large quantities of toxic materials such as high level radioactive wastes are often stored in spent reactor storage pools, or generated during reprocessing of spent power reactor fuel or in the operation and maintenance of nuclear power plants. These radioactive wastes must be disposed of safely and efficiently.

The difficulty in the disposal of radioactive waste is even more acute when the concentration of the radoactive moieties exceed about one microcurie per cubic centimeter of waste stream and the radioactive species have a multiyear half-life necessitating immobilization of the radioactive moieties for a period greater than a century.

One of the most generally accepted procedures for the disposal of such wastes is to convert the radioactive waste to dry solid form so that the waste is rendered chemically, thermally and radiolytically stable.

Organic ion exchange media have been employed for the removal of the radioactive ions contained in such wastes but, due to their low threshold for radiation damage, they are not suitable for this purpose. The ultimate radioactive loading level of organic ion exchange media is more limited than inorganic ion exchange media since the former is susceptible to radiation damage at much lower dosage than the inorganic ion exchange media.

Among the inorganic ion exchange media which have been used in the removal of radioactive ions from radioactive wastes, those based on a porous glass matrix as described in application Ser. No. 039,595, (now abandoned) filed May 16, 1979 and application Ser. No. 065,572 now abandoned filed Aug. 10, 1979, have proven to be most useful. Zeolites and sodium titanates have also achieved some degree of acceptability as inorganic ion exchange media for this purpose.

In general, the method employed for the removal of the radioactive ions from liquids (e.g., radioactive waste stream) containing the same comprises passing the waste stream through a suitable container (preferably made of stainless steel) containing the ion exchange medium until the ion exchange capacity of the medium is essentially used. Once the ion exchange capacity of the medium has been used, the problem becomes one of safe disposal of the container containing the spent medium without attendant radiation damage and hazards.

Heretofore, one such disposal procedure for the so-called "low level" radioactive waste streams involved draining the container, sealing and burying the same underground in shallow sites (usually less than about six meters deep).

If the container is improperly sealed, there is the likelihood, and danger, that during transportation to the burial site, the seal may break, causing radioactive material to be scattered into the surrounding areas. In addition, and in areas having extensive rainfall, the steel container will, with passage of a relatively short period of time, rust and thus expose the spent mass to water which leaches the radioactive ions, especially $Cs^{137}$, $Cs^{134}$, $Sr^{90}$, $Co^{60}$, etc. Consequently, the ground water will become contaminated with these ions.

Another method of disposing of the spent ion exchange media involves their solidification with bitumen. However, this procedure causes radiation damage to the bitumen and is a fire hazard.

The spent ion exchange media have also been disposed of by mixing with cement to form concrete and burying the resulting mass. As in the burial method heretofore described, however, this procedure also presents the problem associated with leaching of the radioactive ions and contamination of the ground water.

The ion exchange media can be placed in a high integrity container designed to last several hundred years. However, during this period, the ion exchange media will release gases due to, for example, radiolysis and decay of organic matter. If this gas is not vented, the container will explode. If it is vented, ground water will enter the container. In either case, it will not perform as a high integrity container.

Another method of disposal of spent radioactive ion exchange medium in a loose, dry-powdered form involves removal of said medium from the ion-exchange container and melting it with glass frit to form borosilicate glass. The requirement of handling such loose, dry powders which are not only abrasive but also have a significant amount of respirable fines, dictates the use of hot cells, complicated out gassing systems and remote maintenance, all of which translates into an expensive operation. See, Electric Power Research Institute Report Number EPRI NP-1087 SIA 78-414 "Nuclear Waste Management Status and Recent Accomplishments" May, 1979.

Thus, notwithstanding numerous methods which have heretofore been proposed for radioactive wastes disposal, and a variety of compositions employed for decontaminating such wastes, the problem of effective decontamination of these streams and safe disposal of the spent media resulting from the decontamination process continues to present serious difficulties. Consequently, effective utilization of nuclear power plant facilities still remains dependent on the development of safe and environmentally acceptable methods of decontamination of radioactive waste streams and the disposal of the spent ion exchange mass resulting from treatment of these streams.

Accordingly, an object of this invention is to provide a novel method of removing radioactive ions from a liquid containing the same which comprises contacting said liquid with a novel composition having ion-exchange capability (which removes said radioactive ions from said liquid), followed by sintering the resulting radioactive composition below the temperature which causes substantial volatilization and escape of the radioactive species to the atmosphere.

Another object of the invention is to provide a novel method of decontaminating a radioactive-containing liquid which comprises contacting said liquid with an inorganic ion-exchange material characterized by a relatively high sintering temperature and a high capacity for radioactive species, thereafter adding to the resulting contaminated material an additive that has the effect of lowering the sintering temperature, followed by sintering the resulting admixture without disseminating volatilized radioactive species to the atmosphere.

Another object of the invention is to provide a novel composition comprising high melting, inorganic ion-exchange material admixed with a sufficient amount of an additive, the resulting admixture having a sintering temperature significantly lower than the ion-exchange material per se.

It is another object of this invention to provide a novel method of making the aforesaid inorganic ion-exchange admixtures, in particular, homogeneous admixtures.

Another object of the invention is directed to novel articles of manufacture, in particular, novel containers capable of withstanding high sintering temperatures and which include with their structure the aforesaid novel inorganic ion-exchange admixtures.

It is another object of the invention to provide novel compositions comprising radioactive inorganic ion-exchange material plus an additive hereinafter defined, said compositions characterized by relatively low sintering temperatures whereby substantial dissemination of the radioactive species in said material is prevented during sintering of the compositions.

It is also an object of this invention to provide a novel apparatus for removing radioactive species from a nuclear waste stream, said apparatus including within its structure the aforesaid novel compositions which can be sintered within the environment of said waste stream.

SUMMARY OF THE INVENTION

In accordance with one aspect of the present invention a liquid, in particular, a liquid waste containing radioactive species are decontaminated by the removal of said ions therefrom. The decontamination process employs an inorganic ion exchange material which has ion exchange affinity for the radioactive species in the said liquid.

The process basically involves passing the radioactive liquid, e.g., nuclear waste stream, through a container of inorganic ion-exchange material, e.g., a column or a cannister, whereby the radioactive species are trapped within the material. Thereafter, the radioactive-containing ion exchange materials can be dried, e.g, by vacuum, heating, etc., followed by sintering said material to immobilize, encapsulate and/or fix the radioactive species within the sintered body without causing significant dissemination of such species to the atmosphere.

The ion exchange composition employed in one aspect of the decontamination process can be a mixture of an inorganic ion exchange medium and an additive (further characterized hereinafter) which is relatively inert in the decontamination step of the novel process.

By the practive of the invention(s), there results several advantages viewed from costs, environment and energy standpoints. The admixture of contaminated ion-exchange medium and additive is characterized by a relatively low sintering temperature as compared to the contaminated ion-exchange medium. At such relatively low temperature there is a substantial reduction in the sublimation of radioactive species into the environment and a concomittant savings in energy. Also, there are savings in the fabrication of the container when, e.g., the use of stainless steel, such as 304 L, in lieu of the more expensive Inconel and the like metals is used.

Broadly, the ion-exchange material is characterized by non-radioactive, replaceable ions capable of being exchanged by radioactive ions from the liquid.

Porous silicate glass or porous silica gel, natural or synthetic clays, hydrated metal oxides and alkali metal salts of such hydrated metal oxides, such as sodium titanate, may constitute the ion exchange medium.

DETAILED DESCRIPTION OF THE INVENTION

This invention relates to: (1) an inorganic ion exchange media useful in removing radioactive moieties from water; (2) an additive which allows the ion exchange media to be sintered to a monolith at a relatively low temperature thus entrapping the radioactive and/or toxic moieties in a highly durable waste form suitable for disposal; (3) an ion exchange container suitable for (a) ion exchange, (b) sintering of the additive+ion exchange media and (c) disposal of the waste form including methods of carrying out the sintering in those cases where the ion exchange media has become highly radioactive due to ion exchange; (4) methods of producing the intimate mixing of additive and ion exchange media necessary to insure adequate sintering; (5) methods of disposal of the sintered mixture and container.

The apparatus of the present invention is comprised of an ion exchange media, through which a liquid may be passed for the removal of radioactive ions, and which is designed so as to permit heating of the ion exchange media to form a durable material in which the removed radioactive ions are fixed, and further provides that such apparatus may be operated within a liquid pool, which may serve as a means of radioactive shielding and a means to cool the outer surfaces of the apparatus.

The apparatus is basically comprised of an ion exchange media, a container for the media called the inner container, a heating means, and in some preferred configurations, an outer container and/or a liquid shielding pool. The ion exchange media is described below.

The purpose of the inner container is to hold the ion exchange media and to provide a physical barrier between the radioactive wastes and the environment. The container preferably will be able to withstand possible damage during an accident in shipping or storage as well as be able to endure the heating to sintering of the ion exchange media.

The choice of the canister materials is dictated primarily by the requirements of high temperature strength, resistance to corrosion from the molten ion exchange media, resistance to stress corrosion cracking, ductility, and toughness. Stainless steels, such as 304L Stainless Steel have been examined and found to be useful for this purpose. Also, a number of corrosion-resistant alloys of Ni and Cr such as Inconel 601 have also been found to be suitable. Other similar alloys also would be suitable.

304L Stainless Steel has the advantages of lower cost, ease of fabrication, machining and welding, but has a lower upper use temperature and less resistance to stress corrosion cracking than Inconel 601.

The strength of 304L Stainless Steel is about 60% of that of Inconel 601 up to about 1050° C. which is a practical upper use temperature for the 304L Stainless. Above this temperature, excessive oxidation of 304L Stainless occurs in air, and in vacuum its strength is lowered apparently because of the absence of nitrogen. Inconel 601 does not suffer the corrosion problems and its use can be extended up to about 1150° C. With these temperature limits and published creep strength data, one practiced in the art can design a cannister which will withstand the requirements for processing of radioactive wastes as described herein. Further, such a cannister can meet the requirements for shipping and extended storage of the solidified waste.

The choice of alloy to be used is dictated by the sintering temperature of the ion exchange media-additive mixture (described below), with 304L Stainless Steel being preferred for temperatures below about 1050° C., because of its lower cost, and Inconel 601 being preferred above this temperature because of high temperature strength and corrosion resistance.

In a separate embodiment of the invention, the heating means may be an integral part of the apparatus or may be an independent apparatus. The heating means may be a resistance heater or an RF (radio frequency) heater. If the heating means is an integral part of the apparatus, resistance heaters are preferred for cost and versatility since they can provide, at lowest cost, temperatures for 1200° C. and can be configured to provide zone heating if desired. Resistance heaters are discussed below. If the heating means provides an independent heat source, any convenient heat source, e.g., resistance heaters, may be used, but RF heating may be preferred because of its low maintenance cost and its versatility. In such a case, the container, which is a metal, can serve as a susceptor for the RF power.

The optional outer container serves as a further barrier, in addition to the inner container, between the radioactive wastes and the environment. For this reason, its design and the choice of container materials is governed by similar constraints as for the inner container. If the apparatus is to be operated in a liquid pool, and has an integral heating means, the outer container acts as a barrier between the pool and the heating means. Further, the outer container may be required to withstand the pressure exerted by the liquid when the apparatus is submerged and the interior of the apparatus is evacuated and the heating means is activated.

Figure 1:
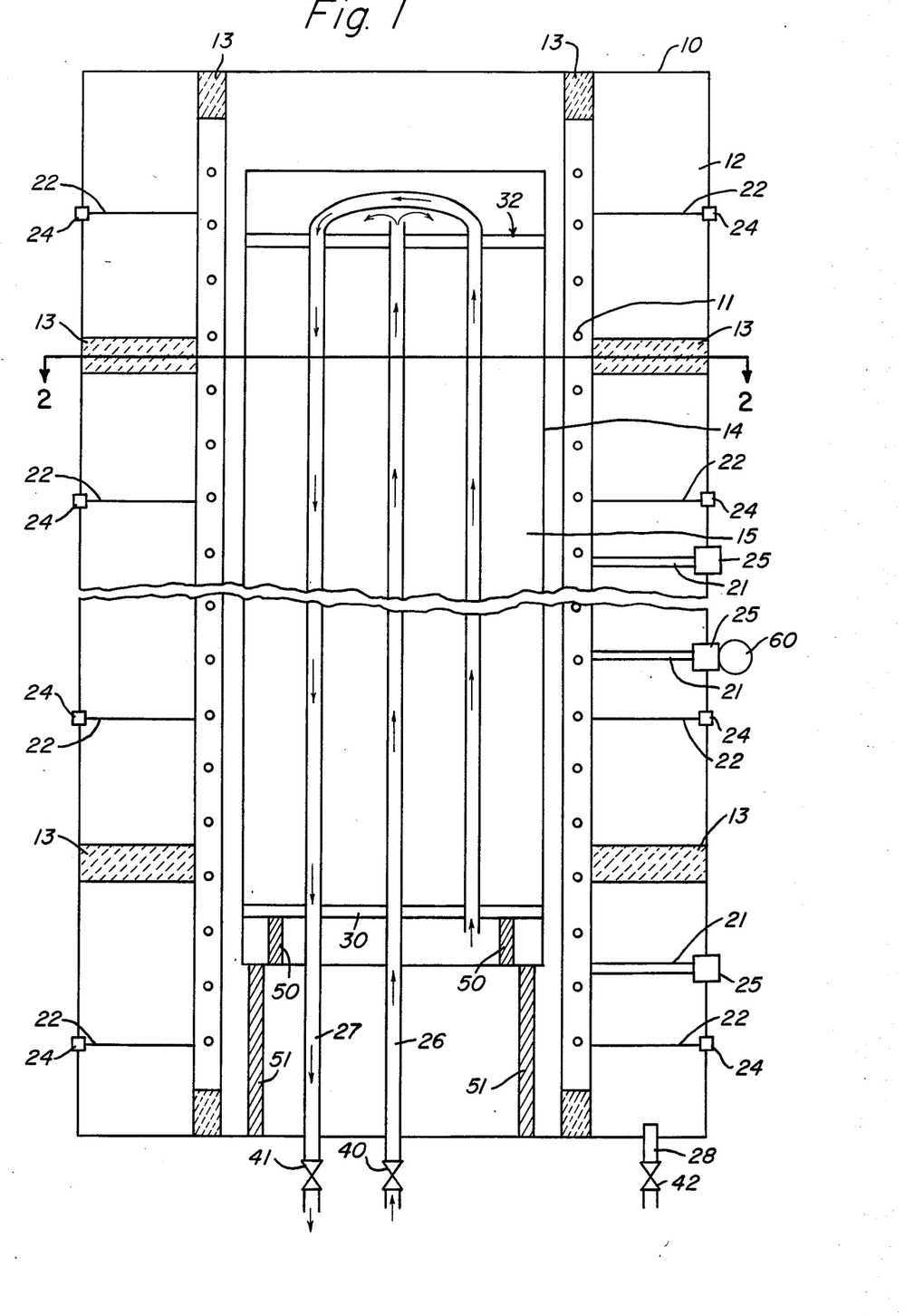
FIG. 1 is a vertical, cross-sectional view of a container in accordance with the present invention.
Figure 2:
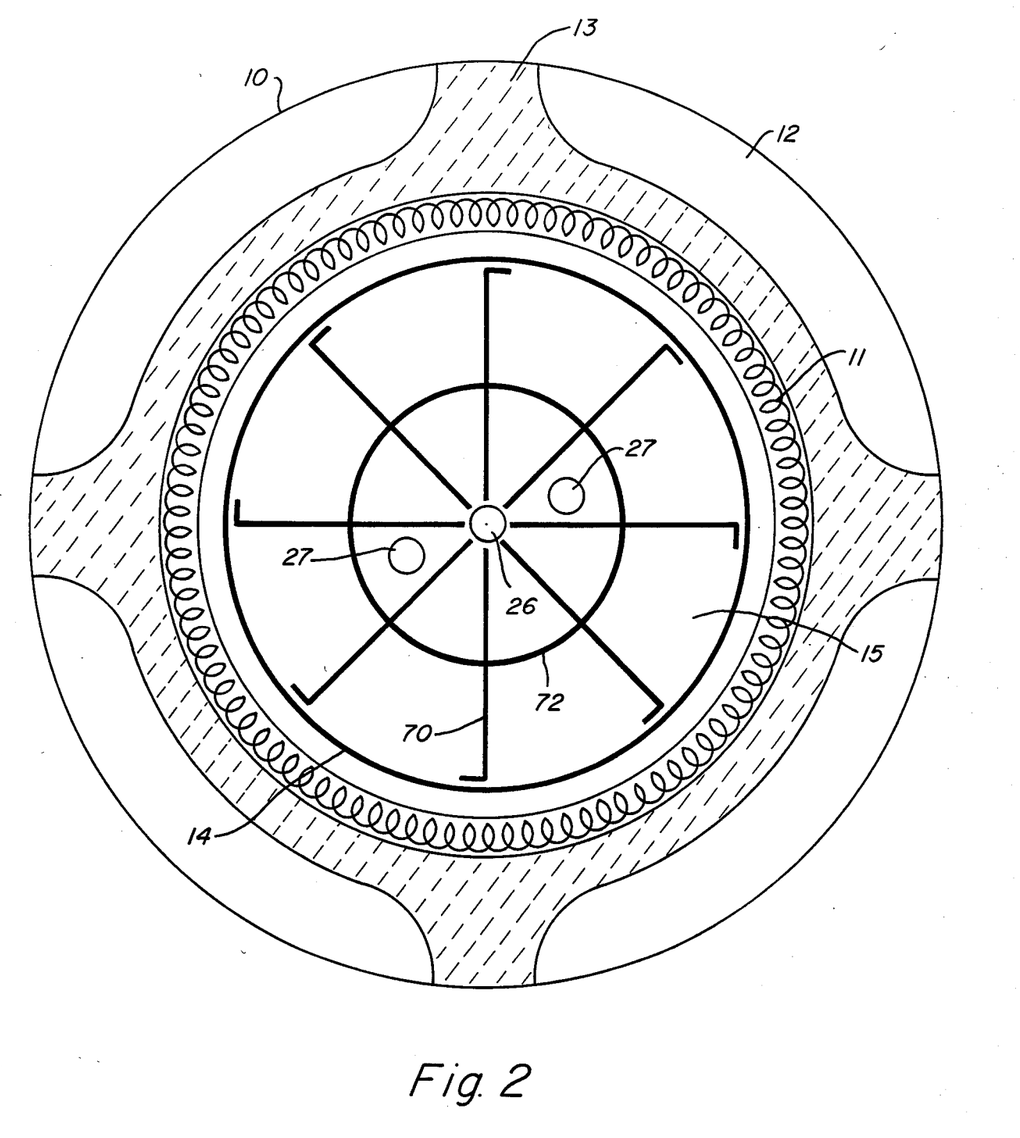
FIG. 2 is a horizontal, cross-sectional view of the container of FIG. 1 taken along the line 2—2.

To illustrate further details of the apparatus, one preferred embodiment of the invention is shown in FIGS. 1 and 2. FIG. 1 illustrates in a cutaway view (with the cut being a plane passing through the axis of the basically cylindrical apparatus). The identifying numbers are the same in the two figures. FIGS. 1 and 2 illustrate major components of the apparatus to which, in operation, other components and design details would be added by those practiced in the arts of mechanical design, heat transfer, and temperature control.

The apparatus is comprised of an outer jacket 10 which may be of any convenient shape, which is preferably a hollow right circular cylinder with closed ends. The outer jacket is preferably made of metal such as carbon steel, stainless steel, Inconel or other suitable metals capable of sustaining the temperatures reached during the heating of the ion exchange material and having sufficient mechanical strength to withstand the pressure exerted by the liquid when the apparatus is evacuated. The thickness of the metal and the details of the shape can easily be determined by one practiced in mechanical design. In one embodiment of the invention, the metal is 304L stainless, preferred because of its relatively low cost and high durability. In one embodiment of the invention the inner surfaces of the outer jacket 10 are polished, or are coated with a reflecting coating or lined with a reflective film to reflect thermal radiation. The wall and ends of the jacket may be traversed by pipes, electrical feedthroughs or other components, some of which are illustrated in FIG. 1 and are discussed below.

The heating assembly 11 is contained within the outer jacket 10. Between the walls of outer jacket 10 and the heating assembly 11 is the space 12, which can be evacuated to reduce heat transfer from the heating assembly 11, to the outer jacket 10 or it may be filled or partially filled with supports or insulating materials, or it may be filled with gas during part of the operation of the apparatus to promote heat transfer from the central region of the apparatus to the outer jacket 10. In the preferred embodiment, one or more heater support spacers 13, made of insulating refractory material, are in the space, 12. In addition pipes, other supports, electrical leads or other apparatus may be in or pass through the space, 12, as discussed below and as required by those practiced in design.

The heating assembly, 11, may be comprised of any suitable electric heater or plurality of heaters with resistance heaters being preferred. In a preferred embodiment, the heating assembly is basically cylindrical in shape with its axis essentially coincident with that of the axis of outer jacket 10. The outside diameter of the assembly 11 is less than that of the outer jacket 10, and the inside diameter of 11 is greater than that of the inner jacket 14. The length of the assembly is less than that of the length of outer jacket 10, and preferably greater than the length of inner jacket 14. In a preferred embodiment, the heater assembly is comprised of more than one heater element. Each element of the assembly in this embodiment is a right circular cylinder with a diameter the same as the whole assembly. A preferred element is a KANTHOL type A1 heater wire embedded in a cylindrical ceramic substrate. In the preferred embodiment, each element has independent electrical power leads 22 and a separate temperature sensor or sensors which are preferably thermocouple probes 21. In the preferred embodiment, separate temperature control of elements permits the ion exchange media 15 to be heated in a zone manner. The zone is defined by the volume within a particular heater element. In the preferred embodiment, during the heating stage of the process, the zones are heated in such a manner that, if desired, the ion exchange media may be heated starting from the bottom zone and progressing upward to the top zone in a programmed manner as determined by the drying and sintering characteristics of the ion exchange media 15. The temperature controls for the heater assembly are located remotely from the apparatus.

The power leads 22 and thermocouple probes 21 pass through the space 12 and pass through the wall of outer jacket 10 via suitable electrical feed throughs 24, compression feed through 25 or other suitable feed through means as selected by those practiced in the art. The inner jacket 14 is a container of any convenient shape and of suitable materials as discussed previously with 304L stainless steel being preferred, and in one preferred embodiment, is essentially a right circular cylinder with closed ends, with its axis essentially coincident with the axis of 11, the heater assembly. The inner jacket 14 is supported by a plurality of supports 51. The inner jacket 14 is penetrated by at least two pipes 26 and 27, which are the inlet and outlet pipes, respectively. At the traversal point, the pipes are sealed in a leak-tight fashion, preferably by welding. The inlet pipe passes through the sintered disc filter 30 which is a stainless steel sintered disc. The disc is weld sintered to the pipe at the traversal point. The inlet pipe also extends through the media 15 and terminates above the top end of the ion exchange media. In one embodiment of the invention, the ion exchange media is constrained at the top by a second stainless steel sintered disc 32 through which the inlet tube 26 also passes and to which it is sealed at the traversal point. The sintered discs 30 and 32 are welded to the inner surface of the inner jacket 14.

In one embodiment of the invention, the outlet tube terminates above the upper sintered disc 32. In a preferred embodiment, the outlet pipe 27 is essentially an inverted U shape and traverses the lower sintered disc 30 where it is weld sealed at the traversal point, then passes through the ion exchange media 15, passes above the top of the ion exchange media and through the upper sintered disc 32, forms a U and returns through the upper sintered disc 32, through the ion exchange media 15, the lower sintered disc 30 and terminates in the space between the lower sintered disc 30 at the bottom of the inner jacket 14. The pipe 27 is weld sealed to the sintered discs 30 and 32 at each traversal point.

Outside the outer jacket 10, the pipes 26 and 27 are terminated by suitable closures such as valves 40 and 41, which in one preferred embodiment are air operated valves.

Within the inner jacket 14, there may be supports for the disc 30 such as the supports 50 which are a plurality of posts welded to the bottom of the inner jacket 14, and/or to the disc 30. In addition, the inner jacket 14 may be supported with respect to the outer jacket 10 by supports 51.

The outer jacket 10 is in one preferred embodiment, traversed by pipe 28 which serves as a vacuum or gas port, which is sealed at the traversal point to the outer jacket 10 and which terminates outside outer jacket 10 by a valve or suitable closure 42. The outer jacket 10, in a preferred embodiment, may optionally be traversed by a vacuum feed through such as thermocouple gauge tube 60 which is sealed at the traversal point by a suitable means such as pipe threads, welding or compression fitting.

FIG. 2 shows a cross-section view of the apparatus showing the heat transfer fins 70 which are preferably made of metal and which are not shown in FIG. 1 for clarity. The fins fit in the space between the sintered discs 30 and 32 or are above the lower disc if only one disc is present. The heat transfer fin assembly is held together at the top and bottom by rings 72 which are welded to the fins at the points of intersection. In addition to the mechanical supports and spacers indicated, additional such supports and spacers may be added by one practiced in the art to provide mechanical stability and strength to the apparatus. Further, the shapes and construction of the inlet and outlet pipes 26 and 27 and the outer jacket 10 and inner jacket 14 may incorporate design features to limit stress during the heating steps. To further explain the function of the components of the apparatus, the typical operation of the preferred apparatus is described.

Before operation, the ion exchange media is properly prepared as is described below. The various utilities, sensor controls, inlet and outlet pipes are connected. Valves 40 and 41 are opened and the radioactive liquid flows through inlet pipe 26, passes through the upper sintered disc 32, passes through the ion exchange media 15 and through the lower sintered disc 30 and is forced out through the outlet tube 27. The apparatus may be submerged in a water pool for shielding. This pool can be the fuel element storage pool of a reactor. The purpose of the inverted U shape of 27 is to prevent molten radioactive ion exchange media, produced during the heating stage, from reaching the outlet valve 40 in the event of accidental leaking of the sintered disc during the heating stage.

The radioactive liquid flows through the ion exchange media 15 whereupon the radioactive ions are removed. The effluent from the apparatus is monitored to verify the removal of the radioactive ions and to indicate when the capacity of the ion exchange media 15 for removal of the ions has been reached. If required, the effluent may flow through a second apparatus or filter for further polishing of the liquid before the liquid is released for disposal or further use.

When all the liquid has been cleaned, or the capacity of the ion exchange media 15 has been exhausted, the flow of radioactive liquid is stopped. Clean water is then flowed through the apparatus entering 26 and exiting 27 to wash the pipes and valves 40 and 41. The inner jacket 14 is then evacuated to remove excess liquid in the ion exchange media. The outer jacket 1 may be evacuated through a vacuum port 28 at this time or later during the heating steps. Sufficient ambient temperature vacuum drying may be accelerated by heating the ion exchange media via the heater assembly 11. In the preferred embodiment, the temperature of the ion exchange media is raised by zones, with the lower portion of the ion exchange media being heated first. By heating to sintering from the bottom and proceeding toward the top, volatilization of radioactive materials can be minimized. Material volatilized in the hot lower regions will recondense in the cooler upper regions with the result that only a small percentage of all the volatilized material will escape before the top region of the media is finally sintered.

After sintering, the inner jacket 14 may be rapidly cooled by allowing gas to enter the space 12 via the vacuum port 28. After the apparatus is cooled, the utilities, sensors and pipes may be disconnected and the apparatus may be prepared for storage or transportation to a storage site.

According to the present invention, an inorganic ion exchange media is used to remove radioactive ions from solution. The ion exchange media used in the invention is a porous inorganic structure having a surface area (as usually measured by BET) greater than about 20 $m^2$ per gram or $cm^3$. In the case of cation exchangers the media will exchange $H^+$, alkali metal ion, alkali earth metal ions, group IB or IIB metal ions or ammonium ions for the radioactive ions in solution. Since it is possible to tie organic molecules to a porous silica glass matrix, the media may have chelating functions in its surface (U.S. Pat. No. 4,333,847). For anions, the media usually has available $OH^-$ or $Cl^-$ for exchange; however, $F^-$, $NO_3^-$, and other anions may be used. Also, it can have sites which will complex with specific atoms in solution whether the atoms are in the form of cations, or anions or are neutral.

The inorganic ion exchange media may generally be broken down into the following classes: (i) silica based materials including glasses, silica gels and other synthetic and natural silicas; (ii) clays and zeolites, including both natural and synthetic varieties, (iii) hydrated metal oxides including phosphates, molybdates, vanadates, and others; and (iv) alkali metal salts of the above.

Silica gels have long been used as ion exchange media in a number of applications such as chromatographic packing (U.S. Pat. Nos. 3,722,181 and 3,983,299), removal and separation of fission products (U.S. Pat. Nos. 2,717,696 and 2,855,269), and general ion exchange (Patrick and Barclay, Ponomareva et al). Silica glass based media has been used for general removal of a wide range of cations (Ser. No. 370,437, filed Apr. 21, 1982, now U.S. Pat. No. 4,469,628) and anions (U.S. Pat. No. 4,333,897) found in radioactive waste and for removal of organic pollutants (U.S. Pat. No. 3,901,818). Silica gels also have been found useful in chromatographic packing (U.S. Pat. Nos. 3,722,181 and 3,983,299). Various other silicates have been proposed for radionuclide waste entrapment (U.S. Pat. Nos. 3,959,172, 3,451,940 and 3,849,330).

Clays were perhaps the earliest inorganic ion exchange media and have been applied in numerous processes, among them disposal of radioactive waste (U.S. Pat. Nos. 3,274,784, 3,925,992 and 3,093,593). Examples of clays that have been used as ion exchange media are bentonite, muscovite, vermiculite, kaonite, illite, montmorillonites, and nontronite. Zeolites are generally porous sodium alumino silicates that are either natural (e.g., chabazite, clinoptilolite, mordenite, erionite) or synthetic (e.g., those produced by Union Carbide Corp.). Some titano and zircano silicates (U.S. Pat. No. 3,329,481) are also classified as zeolites. These have been used as molecular sieves for purifying gases, for radioactive waste purification (U.S. Pat. No. 3,167,504) and for ammonia removal from waste water.

A number of hydrated metal oxides have been shown to be effective media. Among these are alumina, titania, zirconia (U.S. Pat. No. 3,101,998), thoria and various phosphates (e.g., zirconium phosphate, tantalum phosphate), vanadates and other complex oxides. In some cases these oxides are combined with silica or other binders to provide particle stability. Hydrated metal oxides have been used for removal of radioactive ions (U.S. Pat. Nos. 3,337,737, 3,338,034, 3,522,187 and 2,859,093).

The sodium salts of the hydrated metal oxides also can be used as inorganic ion exchange media. Sodium titanate has been shown to be particularly effective for the removal of radioactive strontium from solution.

In the present invention, the function of the additive is to act as a sintering aid, which lowers the temperature at which a suitable granular powder will sinter. By sintering, we mean heating to a temperature whereby the individual grains of the powder stick together and flow into each other. As sintering progresses the volume of the granular powder will contract as porosity is reduced. A well sintered material may still have some porosity, but it will be discrete rather than interconnected. A well sintered material will be referred to herein as a monolith to distinguish it from the original powders. Since the expansion coefficient of a container in which the sintering is carried out may be different from that of the sintered material, the sintered material may fracture upon cooling. Thus, monolith refers to unbroken or broken pieces of ceramics, glassy, and/or partially or totally crystallized material, made up of the original ion exchange medium and additive which has been heated until sufficient volume reduction has occurred to disrupt the interconnected porosity.

Inorganic ion exchange media, such as those mentioned above, can be sintered without a sintering aid. However, the ordinary process temperatures required for sintering are high enough to vaporize and drive off radioactive substances that may be trapped on the ion exchange media, creating a major pollution hazard. The temperatures required to sinter the ion exchange media are also high enough to destroy most readily available materials that could be used for the ion exchange column cannister. The additive lowers the sintering process temperature by performing one or both of the following functions: (i) In the case where the ion exchange media forms glass grains (either because it was originally glassy or because upon heating to the process temperature, it transformed itself into an amorphous phase) the additive lowers the viscosity and permits the grains to flow into each other. (ii) In the case where the ion exchange media has crystalline grains, the additive can form an eutectic mixture which will lower the liquidous temperature below the desired process temperature, thus causing the whole mass, additive plus ion exchange media, to melt. Note that without the presence of the additive the ion exchange media would have a liquidous temperature higher than the desired process temperature. If an insufficient amount of additive is present to lower the liquidous of the whole mass, a thin liquid layer between the crystal grains can still be formed. Under such conditions mass transfer between regions where the solubility of the crystals is slightly higher, to those regions where it is slightly lower, can still lead to sintering. In either process, (i) or (ii), the sintering time is determined by the viscosity of the fluid additive plus dissolved ion exchange media; the lower the viscosity, the shorter the sintering time. Thus, it is important that the additive lower the viscosity.

The ideal additive has the following properties: (a) It lowers the sintering temperature of the ion exchange media+additive below the maximum allowed process temperature, which is determined by the lowest of the following two temperatures: (1) the maximum temperature the ion exchange column cannister can withstand or (2) the temperature at which the radioactive substances trapped on the ion exchange media volatize appreciably. (b) It lowers the viscosity of the ion exchange media+additive mixture sufficiently to give good sintering in a reasonable amount of time. (c) It does not deleteriously affect the ion exchange capacity and efficiency of the ion exchange media. (d) It easily mixes with the media to form a uniform, homogeneous mixture. (e) It sinters with the ion exchange media to form a highly durable monolith. These properties will be discussed in more detail below.

As discussed above, currently used cannister materials can ordinarily withstand maximum preferred process temperatures of less than about 1200° C. The temperature at which the radioactive substances trapped on the ion exchange media volatilize appreciably, of course, depends on the nature of those substances. For example, radioactive cesium volatilizes appreciably at temperatures above 1050° C. Radioactive substances such as uranium, plutonium, strontium and cobalt would not be expected to volatilize until temperatures considerably higher than 1050° C. are reached, whereas a substance such as iodine would be expected to volatilize at temperatures well below 1050° C. On the basis of the above discussion, it is noted that the maximum allowable process temperature for sintering will be in the neighborhood of 1050° C. or lower. The examples provided below demonstrate that a variety of additives can be used to produce good sintering for a variety of inorganic ion exchange media at temperatures of 1050° C. and below. Without additives, the ion exchange media of the invention would sinter at temperatures in excess of 1300° C.

As noted above, the required sintering time is determined by the viscosity of the fluid additive plus dissolved ion exchange media, the lower the viscosity the shorter the sintering time. In general sintering occurs in a matter of hours when the viscosity is below $10^6$ Poise. For most substances viscosity can be lowered by raising the temperature.

For example, the viscosity of the glass used as Additive B, illustrated in the examples, is halved when the temperature is increased from 1000° C. to 1050° C., whereas the viscosity of Additive C drops by almost three orders of magnitude as the temperature rises from 720° C. to 1050° C.

The most important viscosity as it relates to the present invention is that of the additive+ion exchange media mixture. We have discovered that, for a given ion exchange media, good sintering at 1050° C. can be produced by using an additive having a viscosity below about $10^3$ Poise at 1050° C., preferably below $10^2$ Poise. The Examples illustrate that the additives that meet the requirement give good sintering at an additive volume of 20 percent. The additives which fail to meet this requirement fail to produce good sintering.

Three other factors controlling the sintering can also be illustrated using the Table below, which summarizes the examples.

TABLE I

| Additive | Additive Vol % | Viscosity of Additive at Sintering Temp (Poise) | Sintering Temp (°C.) | Sintering Time (min) | Performance* Index |
|---|---|---|---|---|---|
| 1 A | 50 | $10^2$ | 1050 | 180 | 3 |
| 2 A | 20 | $10^2$ | 1050 | 300 | 3 |
| 3 B | 50 | $10^5$ | 1100 | 15 | 1 |
| 4 B | 50 | $10^4$ | 1250 | 15 | 3 |
| 5 B | 20 | $10^5$ | 1100 | 15 | 0 |
| 6 C | 20 | $10^3$ | 1050 | 180 | 2 |
| 7 D | 20 |  | 1050 | 180 | 2 |
| 8 E | 20 | 1 | 1000 | 60 | 3 |
| 9 F | 33 | $10^4$ | 1050 | 10 | 0 |

*3 = good sintering
2 = medium sintering
1 = poor sintering
0 = no sintering

The first factor to be considered is that raising the temperature lowers the viscosity of the mixture and promotes sintering. This effect can be demonstrated for the mixture by comparing the results for 50 volume % Additive B at 1100° C. and 1250° C. (lines 3 and 4 of Table I). The lower temperature gives poor sintering whereas the higher gives good sintering. The second factor is that sintering improves as the percentage of additive increases. Comparing lines 5 and 3 of Table I, it can be seen that increasing the volume percent of B from 20 to 50 improves the sintering performance from no sintering to poor sintering. The third factor controlling the sintering process is that the sintering time can be reduced by increasing the percentage of additive. This is illustrated by lines 1 and 2 of Table I. The sintering time drops by 3/5 as the volume of Additive A increases from 20 to 50%. Increased percentages of additive thus lower the mixture viscosity. This improves sintering allowing shorter sintering times or lower sintering temperatures. Unfortunately, as discussed below, increased percentages of additive have a deleterious effect on ion exchange capacity if the additive is present during the ion exchange process.

Additives that give good sintering properties to the mixture generally have compositions that include high percentages of all or some of the following components: alkali metal oxides; alkali earth oxides; $B_2O_2$; $P_2O_5$; PbO; $B_2O_3$. Additives that have high percentages of $SiO_2$, $Al_2O_3$ or other high melting refractories such as $ZrO_2$ generally impart poor sintering qualities to the mixture.

If present during the ion exchange process the additive can affect the ion exchange capacity and efficiency of the mixture in a variety of ways. The additive acts to dilute the ion exchange media in the ion exchange column. Since the ion exchange capacity of the mixture depends on the amount of ion exchange media present, the higher the percentage of additive, the lower the capacity of the mixture. Thus, if present during ion exchange, the volume percentage of additive should be below 50%, preferably below 30% and most preferably below 20%.

The additive may also affect the ion exchange capacity of the mixture, if at any time prior to or during the ion exchange process, the additive releases constituents which interfere with the removal of the radioactive substances from solution. If, for example, the additive releases lead ion to the ion exchange media prior to, or during the ion exchange process, the capacity of the ion exchange media to remove lead ion from solution could be reduced or even eliminated. The species released by the additive need not be identical to the species to be removed from solution for the reduction or elimination of the capacity of the ion exchange media to occur. For example, the release of large quantities of Na+ or K+ ion would tend to interfere with the removal of Cs+ from solution. Similarly the release of Ca++ or Mg++ would interfere with the removal of Sr++ from solution. In both of the above cases, the released ions compete for the ion exchanges sites of the ion exchange media with the radioactive ions.

The additive may also interfere with the ion exchange media by producing a chemical reaction with species in solution to produce a new species, which the media cannot effectively remove from solution, or by physically coating the ion exchange sites of the ion exchange media thereby reducing capacity.

In the present invention, three types of additive are used. The first is a powdered solid which is mixed with the ion exchange media and is present during the ion exchange process. This class of additives must have a very low dissolution rate in order that (a) the additive does not dissolve away during the ion exchange process and (b) the additive does not release interfering substance into solution. To illustrate the permissible dissolution (leach) rate, consider the following situation which would be characteristic of an additive powdered to the 355–210 $\mu$m size having a leach rate of $1 \times 10^{-5}$ g cm$^{-2}$d$^{-1}$, a density in powdered form of 1 g/cm$^3$, and a surface area of 100 cm$^2$/g. Referring to the dissolution rate of the additive during the ion exchange process, the fraction of the additive that would dissolve in one day would be equal to the leach rate times the surface area or 0.001 per day. It would thus take 10 days of passing ion exchange solution over the additive for 1% of it to dissolve. Thus, dissolution rates should be less than $10^{-4}$ g cm$^{-2}$d$^{-1}$, preferably less than $10^{-5}$ g cm$^{-2}$d$^{-1}$, at the operating temperature.

Referring to the release of an interfering substance into solution, and assuming the percentage of the additive in the mixture is 20%, then for every cm$^3$ of mixture there would be 0.2 cm$^3$ or 0.2 g of additive and 0.8 cm$^3$ of media. For the leach rate of $10^{-5}$ g cm$^{-2}$d$^{-1}$, 0.2 mg of the additive will dissolve in one day per cm$^3$ of mixture. A typical inorganic ion exchange media has a capacity of about 10 mg of ion/cm$^3$, so that even in the unlikely event that all of the dissolved additive formed substances that were absorbed on the ion exchange media, only 2½% of its capacity would be lost per day. Thus to prevent deleterious effects on the ion exchange media's capacity, the dissolution rate of a powdered solid additive in solution should be less than $10^{-5}$ g cm$^{-2}$d$^{-1}$, at the operating temperature.

A second type of additive is introduced as a powdered solid after ion exchange has taken place but prior to sintering, thus avoiding the problem of interference of the additive in the ion exchange process. This type of additive requires that steps be taken to open the ion exchange cannister after ion exchange, to add the additive to the cannister and to mix the additive+ion exchange media to provide a uniform, intimate mixture suitable for sintering. This mixing can be obtained mechanically by stirring or by other means described below.

A third type of additive is introduced in a solution form. In this embodiment of the invention the additive is dissolved in a suitable solvent, which will dissolve appreciable amounts of the additive, and will evaporate cleanly, leaving the aid behind. When using this additive, the ion exchange material is dried, and enough additive solution is introduced to cover the ion exchange material. The solvent is then evaporated leaving behind the additive as a coating on the ion exchange material, or as a fine powder dispersed uniformly throughout the ion exchange media. This process may be repeated several times to increase the amount of sintering aid deposited with the ion exchange media.

This type of additive has the advantage that it is not present during the ion exchange process. There is thus no dilution of the ion exchange media's capacity and no chance for chemical or physical interference with the ion exchange process.

The liquid additive is an alkali metal oxide, SiO$_2$, B$_2$O$_3$, PbO, P$_2$O$_5$, Bi$_2$O$_3$, ZnO, CoO, MgO and mixtures thereof. The preferred liquid additives are B$_2$O$_3$, P$_2$O$_5$, ZnO, CoO, PbO and mixtures thereof. The additive is dissolved in a liquid solvent. The liquid solvent is water, lower molecular weight alcohols, organic acids, ammonia and mineral acids. The preferred solvent is water or ammonia.

The ion exchange media and additive must be intimately mixed immediately prior to and during the sintering process. In the case where the additive is dissolved in solution, upon the evaporation of the solvent, the additive will be uniformly dispersed throughout the media. When the additive is added prior to the ion exchange process, the intimate mixing of additive and ion exchange media can be obtained by standard mechanical means such as stirring or tumbling. Care must then be taken that the additive and ion exchange media do not separate during any process prior to sintering. Of crucial importance is the process of backwashing which is carried out to remove fines and air pockets from the ion exchange media prior to the beginning of the ion exchange process. Backwashing consists of passing water against gravity from the bottom of the column to the top at a rate that is usually sufficient to lift and expand the ion exchange bed. As is illustrated in the Examples, backwashing can lead to separation of the mixture unless precautions are taken to prevent it. Similar problems can occur during any counter-flow (against gravity) operation.

Separation of additive and ion exchange media, can be prevented in the following ways:

i. The particle size of the two may be adjusted to make up for differences in density so that upon backwashing a uniform mixture is formed. An approximate rule of thumb for choosing particle size is given by:

$$\rho_A S_A^{\frac{1}{2}} = \rho_M S_M^{\frac{1}{2}}$$

where $\rho$ is the bulk density, S the size and A and M stand for additive and ion exchange media respectively.

ii. The mixture is placed in the cannister and confined in such a way that it cannot shift or expand during backwash or counter-flow operation.

iii. Subsequent to the ion exchange process, compressed air is forced upward through the mixture to produce uniform mixing. However, this mixing method must be very carefully performed to avoid release of radioactive materials to the atmosphere.

iv. Subsequent to the ion exchange process the ion exchange media and additive are mixed mechanically by a stirring device such as a paddle. Methods i, iii, and iv are also applicable where the additive is introduced as a solid powder after the ion exchange process. Methods i and ii are the most preferred embodiments of the invention. Methods iii and iv are recognized to be standard industrial methods.

After the sintering, the cannister and monolith are disposed of by storage and or burial. If the cannister is buried on land or at sea, or if during transportation an accident occurs, the monolith will eventually be contacted with water. Such contact will permit the beginning of leaching. It is the purpose of the present invention to minimize the release to the ecosphere of radioactive elements trapped in the monolith. Thus, the additive should be selected such that its composition improves the chemical durability of the monolith.

The requirement for low viscosity during sintering demands the selection of components for the additive of alkali metal oxides, $B_2O_3$, $P_2O_5$, PbO, $Bi_2O_3$ or alkali earth oxides, all of which reduce chemical durability. The selection of components for improved chemical durability $SiO_2$, $Al_2O_3$, and $ZrO_2$ all produce high viscosities. Thus, the composition of the additive has to be a compromise between good chemical durability and low viscosity. Glasses containing PbO seem to be especially suitable in this respect.

The data available on the rates of dissolution of other candidate materials, in particular cements, proposed for the fixation of low and intermediate-level wastes, are not very extensive. In many cases only weight changes have been reported, and these results cannot be applied to the evaluation of either matrix dissolution rates or waste extraction rates, since weight losses tend to be attenuated and often overshadowed by the strong tendency of the materials to absorb water. In order to measure the rate of extraction of components of the cement, it is necessary to determine the levels of such components in the used leachant. Data based on extraction tests carried out on typical construction cements show that, in the case of most Portland cements, the extent of lime dissolution is only limited by the concentration of $Ca(OH)_2$ in saturated aqueous solutions, and that the amount of dissolved CaO under moderately rapid flow conditions can reach 10% of the total weight of the cement within a period of a few hours. For Pozzolanic (ash-containing) cements the attack is slower by about one order of magnitude than for Portland cements. Recently, data from extraction tests have been developed for radioactive waste fixation. In the case of improved Portland cement, the extraction rate at the end of a 100-day test was calculated to be 1 mm/year, corresponding to $9.4 \times 10^{-4}$ g cm$^{-2}$d$^{-1}$. (A density of 2.55 gcm$^{-3}$, characteristic of Pozzolanic cements, is assumed in further calculations.)

The dissolution rates of the monoliths of this invention are generally much lower than the cement dissolution rates. For example the dissolution rate of the monolith formed from Additive A + Media X hereafter called waste form AX is lower than the dissolution rates of the two special cements by factors 3000 and 700, respectively. However, in deciding whether various waste-forms are sufficiently effective as barriers against the dissolution of hazardous components of the solid, a calculation of the amount of dissolution products released into a surrounding medium is much more meaningful than the gross dissolution rate. Such a calculation in the case of a radioisotope which does not have a relatively long-lived parent isotope, and of a uniform (i.e., not a multibarrier) solid waste-form, is based on the equation $$\frac{M_i}{M_{oi}} = \left( \frac{2Dt}{\rho r_o} - \frac{D^2 t^2}{\rho^2 r_o^2} \right) \exp[-t/\tau_i]$$

where $M_i$ is the amount of radioisotope released into the surrounding medium due to the dissolution of the solid and not yet decayed after a certain storage time t, $M_{oi}$ is the initial concentration of i in the waste-form, D is the matrix dissolution rate, $\rho$ is the density of the solid, $r_o$ is the radius of the solid waste-form, assuming cylindrical geometry, and $\tau_i$ is the mean lifetime of the isotope, i.e., the reciprocal of the exponential decay rate (not the half-life). This calculation is valid up to the time given by $$t_c = \frac{2 r_o}{D}$$

at which the matrix has completely dissolved; it is possible to obtain $M_i$ at any longer time $t > t_c$ from the simple exponential expression $$M_i = M_{oi} e^{-t/\tau_i}$$

The values of D and for the three waste-forms under discussion here, i.e., AX and the two cements, at a temperature of 24° C., have been given below. It is assumed that the loading of the waste-form in the case of low or intermediate-level waste will not be so high as to cause the surface temperature of the waste to rise considerably. Although the waste packages will be cylindrical with a typical radius of 30 cm, cracking induced by thermal stresses during the production of the glass and fracturing induced by temperature and humidity fluctuations of the cement will cause the solid waste-form to be broken into pieces of irregular shape with a typical smallest dimension (equivalent to $r_o$ in the cylindrical case) of approximately 1 cm. Each piece will be surrounded by cracks into which water will be able to seep and interact with the solid.

| Material | D(g cm$^{-2}$d$^{-1}$) | $\rho$ (g cm$^{-3}$) |
|---|---|---|
| Portland Cement | $9.4 \times 10^{-4}$ | 3.13 |
| Pozzolanic Cement | $2 \times 10^{-4}$ | 2.55 |
| AX | $3 \times 10^{-7}$ | 2.2 |

Figure 3:
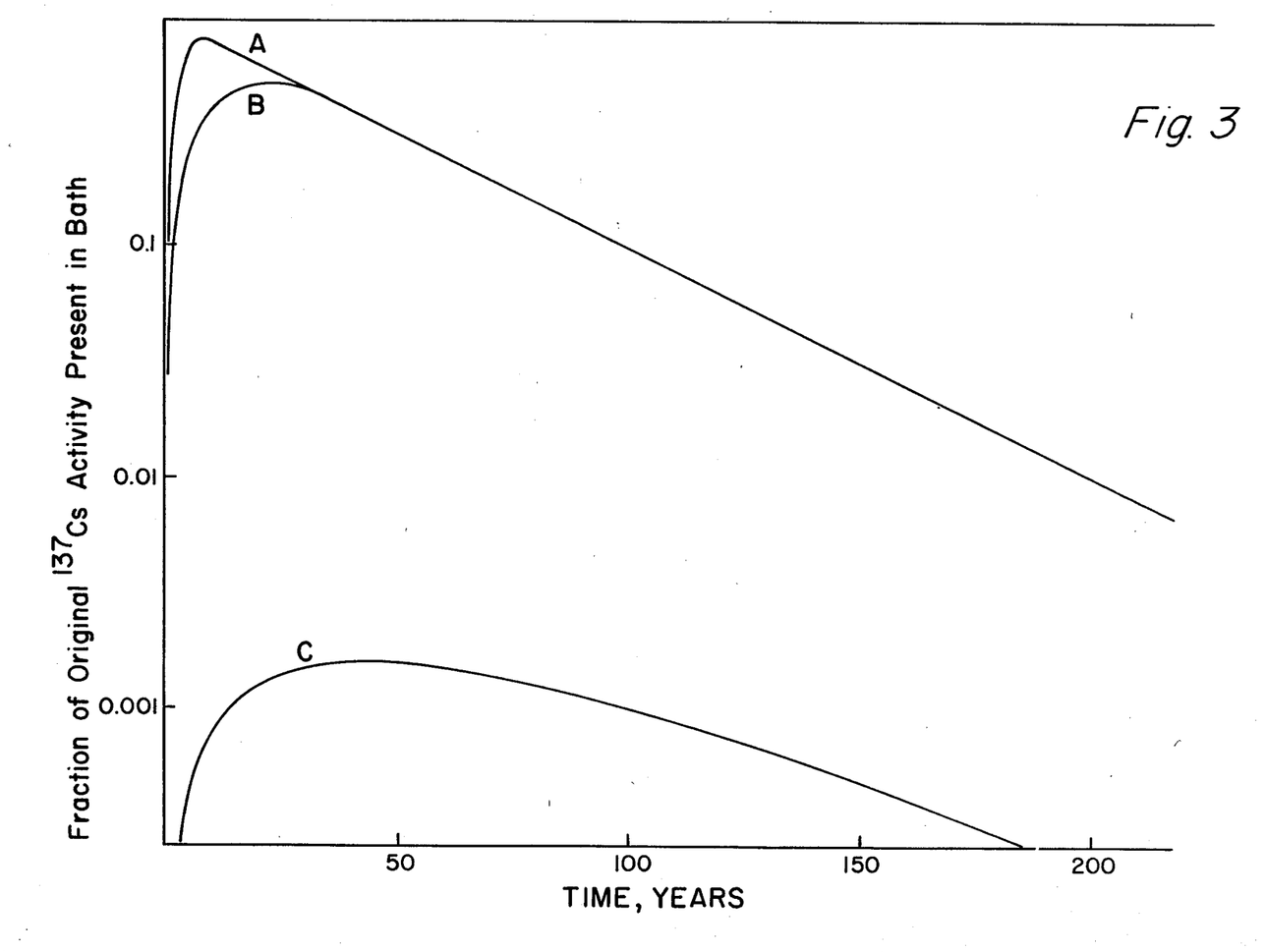
FIG. 3 is a graph of the fraction of original $CS^{137}$ activity present over time for portland cement, pozzolanic cement and an ion exchange composition of the present invention.

The isotope considered here $^{137}$Cs, with a half-life of $t_{\frac{1}{2}} = 30.174$ years and mean life $\tau = T_{\frac{1}{2}}/\ln 2 = 43.532$ years. $^{137}$Cs is the major constituent of low and intermediate-level waste streams; $^{90}$Sr, with a $T_{\frac{1}{2}}$ of 28.1 years, yields very similar results, while other components, such as $^{106}$Ru ($T_{\frac{1}{2}} = 1.0$ year) and $^{60}$Co ($T_{\frac{1}{2}} = 5.26$ years) have much shorter mean lifetimes and are usually much less significant. Upon substituting the above values into Eq. (1) (for $t \leq t_c$), the three curves A, B, and C, which are shown in FIG. 3, are obtained for improved portland cement, special ash-containing (Pozzolanic) cement, and AX, respectively. It can be seen that in the case of continuous exposure to water, most of the radioactivity initially present in the cements will pass into the environment within a short period (82% after 8.2 years in the case of Portland cement, 52% after 22.6 years in the case of Pozzolanic cement). The maximum amount of extraction for the glass can only reach 0.16% of the initial activity in the solid; this level will be reached after a period of 43.5 years. This period coincides with $\tau_i$, since the time $t_c$ required for complete dissolution of the glass, 20,200 years, is very long compared with $\tau_i$, whereas the time for maximum extraction is 9 years in the case of Portland cement. Accordingly, Pozzolanic cement offers no improvement upon Portland cement at periods longer than 35 years.

Another important conclusion derived from FIG. 3 is that after the waste-form first becomes exposed to water, the amount of activity released to the environment within 6 months (typical time necessary to recover waste after transportation accident) will reach 11% of the total activity in the solid in the case of Portland cement, 3% in the case of Pozzolanic cement, and only 0.005% in the case of AX. Furthermore, once exposure to water has taken place, the activity in the medium surrounding the cement will persist at a level exceeding 1% of the total initial activity of the solid for the next 200 years. For AX the corresponding residual activity will only reach 0.02%.

It is important to note that the dissolution rate of AX used in these calculations is very conservative. The data, indicate that in the long term the dissolution rate of AX can be expected to drop by at least a factor of two, under the $3 \times 10^{-7}$ g cm$^{-2}$d$^{-1}$ level observed after 25 days. It can be concluded that after a relatively short period this glass will compare favorably with the best types of borosilicate glass proposed for high-level waste fixation, for example, Battelle PNL 76-68, which has a long-term dissolution rate of $1.4 \times 10^{-7}$ g cm$^{-2}$d$^{-1}$ at 20° C. (The latter result was obtained by prolonged immersion of the glass at 70° C. and then at 45° C. prior to a two-month test at 20° C. which did not show further dependence of the dissolution rate on time.)

It is also necessary to consider the possible preferential leaching of $^{137}$Cs relative to the matrix. In the case of AX containing 0.1% Cs, the 29-day immersion test described above showed that Cs levels in the used leachant always remained below the analytical detection limit of 0.01 mg/lit. Results are available from the long-term test on the Battelle PNL 76-68 borosilicate glass which show that the normalized leach rate of Cs is inly 62% above the silica dissolution rate.

In contrast, the dissolution rates quoted for the cements cannot be considered to be conservative and suitable for use as long-term upper limits. The fixation method based on cements, unlike direct sorption onto forms such as AX, involves adsorption of the waste constituents in zeolites and mixing the zeolites with cement at a ratio of approximately 70:30. Since zeolites are reversible ion-exchange media the chemical durability of the combined product and, in particular, the preferential leach rates of mobil ions, such as Cs$^+$, are likely to be much higher than the dissolution rates of the carefully optimized pure cements.

In addition, the cements have an interconnected open pore structure which will allow rapid penetration of ground water into the waste form followed by rapid diffusion of the mobil radioactive ions out of the structure. The presence of concrete dissolution products such as calcium in the water in the pores will further accelerate the release of radioactive ions from the zeolite into the environment.

In summary, it is demonstrated that waste form AX can serve as an extremely efficient barrier to isolate low and intermediate-level waste constituents from the environment. This material gives protection which is as good as, and possibly better than, the protection against extraction by water fixation. Not more than 0.16% of the initial activity incorporated into AX can escape into the surroundings of the water-form even under continuous exposure to water. On the other hand, even the best materials based on cement are shown to permit leakage of the bulk of the initial activity into the environment within a period of a few years. They are, therefore, definitely unsuitable for use under circumstances which allow for even a slight possibility of contact between the waste-form and an environment having water, wet soil, or a humid atmosphere.

In conclusion, the chemical durability of the monolith should be greater than (and the leach rate therefore less than) about $10^{-5}$ g/cm$^{-2}$/day at 25° C. Preferably, the chemical durability of the monolith is greater than $10^{-6}$ g/cm$^2$/day at 25° C.

EXAMPLE I

This example serves to illustrate a number of features of the invention. The ion exchange media is a glass based ion exchanger that is useful in removing radioactive cations such as Cs-137 from solution. The ion exchange media by itself sinters at a temperature in excess of 1300° C. Such high temperatures are undesirable from two standpoints: (i) a large fraction of the radioactive Cs-137 will volatilize and will not be trapped in the resulting monolith; and (ii) the common alloys which would be preferred for cannister construction such as 304 stainless steel or Inconel cannot be used. In this example, the sintering temperature necessary to produce a monolith is lowered to 1050° C. by the addition of a sintering aid, Additive A. The additive and ion exchange media are mixed dry and loaded in a 304 stainless steel column. Separation of the mixture during subsequent ion exchange operations is prevented by confining the mixture between two stainless steel frits. After the ion exchange process is complete, sintering is carried out in situ under water in a method suitable for applications where the radioactive loading on the column requires the shielding provided by a large pool of water. The final waste form produced consists of a highly durable glass monolith encased in a stainless steel cannister. Such a waste form would provide maximum protection against radioactive release during shipment and burial.

Ion exchange Medium X was prepared as follows:

An alkali-borosilicate glass having the following nominal composition (on weight basis) was melted at 1400° C. in a platinum crucible:

| | |
|---|---|
| SiO$_2$ | 60% |
| B$_2$O$_3$ | 32% |
| Na$_2$O | 3% |
| K$_2$O | 5% |

Cylindrical rods were drawn from the melt, crushed and sieved to collect grains having particle sizes in the range of 350 to 710 micrometers, and heated for 2 hours at 550° C. This treatment resulted in phase separation and an interconnected microstructure. The resulting material was then treated with 3 N HCl at 95° C. whereby the alkali-borate rich phase was leached leaving a porous glass consisting of approximately 95 weight percent SiO$_2$ and 5 weight percent B$_2$O$_3$ with trace amounts of Na$_2$O and K$_2$O. After leaching, the residual HCl was removed by rinsing with deionized water. The resulting porous glass powder was then placed in an aqueous solution of 3.5 molar NaNO$_3$ and 3.75 molar NH$_4$OH at a pH of approximately 11.9 in order to replace protons on the hydrolyzed pore surfaces of the glass with sodium ions (Na$^+$) and ammonium ions (NH$_4^+$) by ion exchange. The Na$^+$ and NH$_4^+$ ions can in turn be replaced by other cations making Medium X an effective inorganic ion exchanger.

Twenty (20) cm$^3$ of Medium X was vacuum dried overnight at room temperature. Additive A, a glass of composition given in Table II, was crushed and sieved to produce grains having particle sizes of 210 to 355 μm.

TABLE II
Composition of Additives (Weight Percent Oxide Basis)

| Oxide | A | B | C | D | E | F |
|---|---|---|---|---|---|---|
| SiO$_2$ | 42 | 81 | 46.0 | 40.0 | | 72 |
| B$_2$O$_3$ | | 13 | | 9.5 | 38.8 | |
| PbO | 49 | | 45.32 | | 61.2 | |
| Al$_2$O$_3$ | | 2 | | | | 2 |
| Na$_2$O | 2 | 4 | 2.5 | 12.9 | | 14 |
| K$_2$O | 6 | | 5.62 | .1 | | 1 |
| MgO | | | | | | |
| Li$_2$O | 1 | | | | | |
| CaO | | | | 2.0 | | 7 |
| Rare Earth Oxides | | | | 8.1 | | |
| Fe$_2$O$_3$ | | | | 11.1 | | |
| ZnO | | | | 5.0 | | |
| TiO$_2$ | | | | 3.0 | | |
| MoO$_2$ | | | | 2.4 | | |
| ZrO$_2$ | | | | 1.9 | | |
| BaO | | | | 0.6 | | |
| P$_2$O$_5$ | | | | 0.5 | | |
| Cs$_2$O | | | | 1.1 | | |
| SrO | | | | 0.4 | | |
| NiO | | | | 0.6 | | |
| Cr$_2$O$_3$ | | | | 0.4 | | |
| TeO$_2$ | | | | 0.3 | | |
| CoO | | | | 0.1 | | |
| Other | | | .56 | | | |

Four (4) cm$^3$ of dried ion exchange Medium X was intimately mixed with 1 cm$^3$ of the powdered Additive A. The combined mixture was gravity fed through a funnel into a 0.50 inch OD×0.035 inch wall, type 304 stainless steel tube of 21¼ inch length having a stainless steel filter disc of 20 μm porosity supported on a retainer ring at a height of 7½ inch from the bottom. The tube was tapped gently to settle the mixture onto the filter disc. A second filter disc was placed in the column on top of the mixture. A spring retainer was inserted on top of the upper filter disc to prevent vertical movement of the glass mixture within the column.

Figure 4:
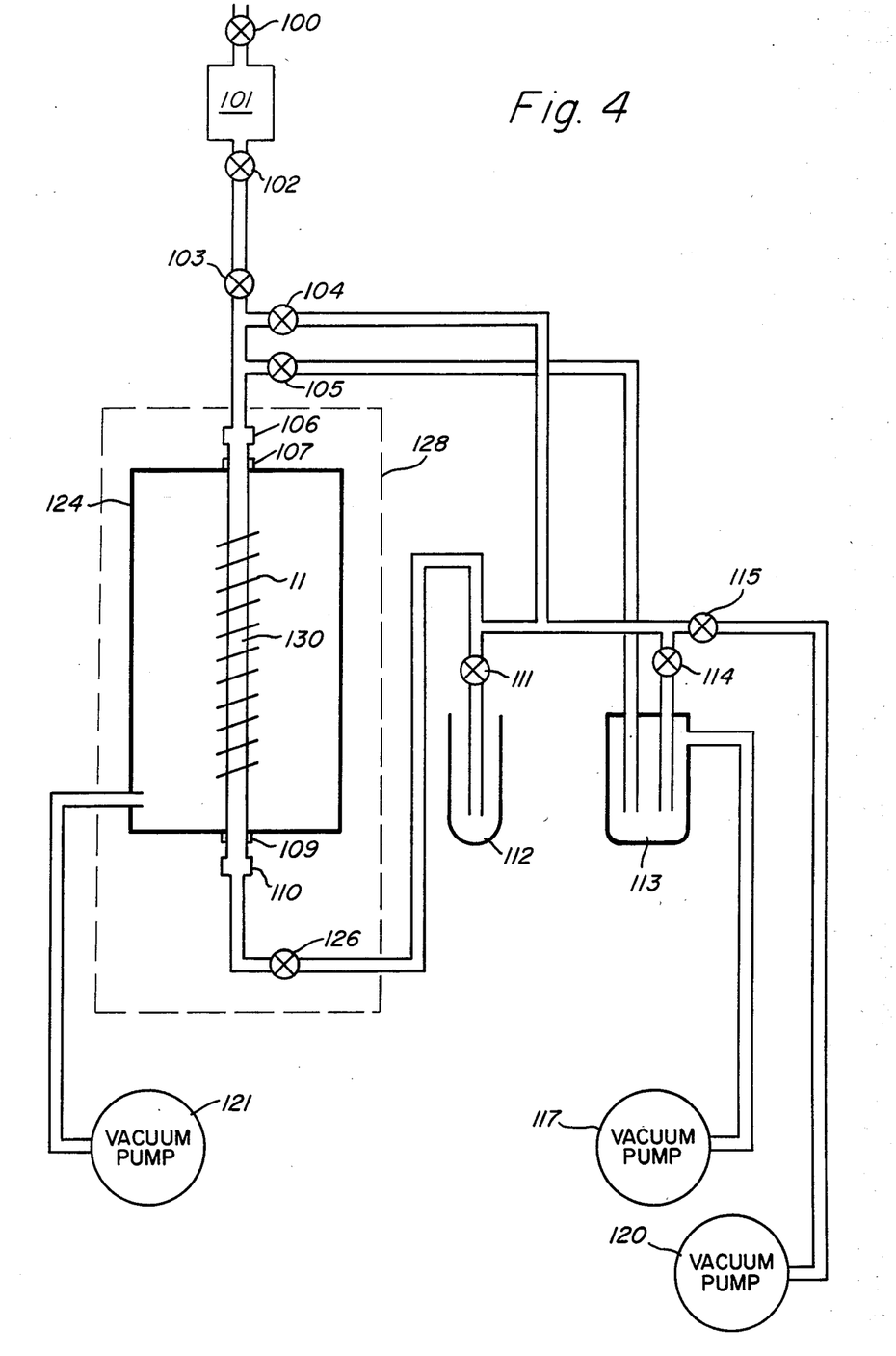
FIG. 4 is a schematic representation of an apparatus for practicing the invention.

Referring now to FIG. 4, the loaded column 130 was inserted into the furnace assembly 124 having heating elements and vacuum sealed by means of two vacuum fittings 107, 109 at either end of the furnace. Additional fittings 106, 110 at the ends of the stainless steel column were used to vacuum seal the column to the upper inlet and lower outlet fluid flow lines. The entire column-furnace assembly was immersed in the vertical position in a tank 128 containing approximately 25 gallons of tap water. Vacuum pump 121 is used to evacuate the furnace completely.

With vent valve assembly 100 removed and valve 102 closed, a 1050 ml. volume of a solution containing 3000 ppm boron, 1000 ppm sodium, and 2 ppm cesium was poured into reservoir 101. All concentrations were determined by Atomic Absorption/Emission Spectroscopy (AA/ES). An additional 50 ml. volume of a Cs-137 solution having an activity of approximately 10 μCi was added to the solution reservoir 101 and the vent valve assembly 100 reinstalled. With valves 100, 102, 103, 104, 105, 111, 114, 115 and 126 closed, the reservoir 112 was filled with 100 ml. of millipore water and the diaphragm vacuum pump 117 was engaged and adjusted to give a 14" (Hg) vacuum. The column was evacuated by opening valves 105 and 103 and backwashed by slowly opening valve 111 and maintaining this valve in the open position until the water stream entering trap 113 was free of bubbles.

An activity detector was mounted outside of the water tank and directed toward the column 130 at the height corresponding to the approximate position of the ion exchange media and additive mixture.

With the backwashing procedure completed, valves 111 and 105 were closed. An influent sample was acquired by opening vent valve 100 and slowly opening valve 102 to allow the influent from reservoir 101 to fill completely the clear plastic line between valves 102 and 103. Valve 102 was then completely opened and valves 103 and 105 were opened to allow the influent from the reservoir 101 to be drawn into trap 113. When no further bubbles emerged from the line connecting valve 105 and the trap 113 an additional 50 ml. volume of solution was drawn into trap 113. Valve 105 was then closed and diaphragm pump 117 was shut off. Trap 113 was removed from the system and emptied. A sample vial was placed at the end of the line from valve 105 and valve 105 was opened allowing the influent sample to flow by the force of gravity directly from the reservoir 101 into the sample vial. After a 10 ml. sample was collected in this manner, valve 105 was closed and the trap at 113 was reinstalled. A total of six separate activity concentration determinations were conducted on the aliquots taken from the influent sample. Each aliquot was evaporated to dryness and counted on a gas flow proportional counter which had been calibrated with a Cs-137 reference source whose activity was known to ±10%. The determined average influent concentration was 6480±580 (one σ) picocuries per ml.

The excess deionized water in the backwash reservoir 112 was discarded and an effluent receiver was installed in its place. Valve 126 was opened. Valve 111 was opened and adjusted to allow a flow rate of approximately 1.5 ml./min of gravity driven influent from reservoir 101 to flow through the column and into the effluent receiver 112. Valve 111 was periodically adjusted to maintain a constant flow rate of approximately 1.5 ml./min during the course of the ion-exchange. After the content of reservoir 101 had passed through the column, valve 111 was closed and diaphram pump 117 was turned on. Valve 114 was opened thereby drawing the residual solution in the column and attached lines into trap 113. When liquid flow into trap 113 terminated, valve 104 was opened and solution entrapped in the lines between valve 104 and trap 113 was similarly withdrawn. Valves 104 and 114 were then closed and valve 105 was opened thereby withdrawing entrapped solution from the line between valve 105 and trap 113. After all liquid flow terminated, valves 105, 103, 102 and 100 were closed, and the effluent receiver valve 112 was removed. Three activity concentration determinations were conducted on samples from the effluent receiver. For each determination a 10 ml. sample of the effluent was evaporated and the residual material was counted in the manner used for the influent samples. The determined average effluent concentration was $9.19 \pm 1.5$ ($\sigma$) picocuries per ml.

The total volume of solution which flowed through the column was 1100 ml. which corresponds to a total activity of Cs-137 of $(6.840 \pm 0.580 \times 10^{-3}\ \mu\text{Ci/ml})$ $(1100\ \text{ml}) = 7.128 \pm 0.638\ \mu\text{Ci}$. The total effluent activity was $(9.19 \times 10^{-6}\ \mu\text{Ci/ml})$ $(1100\ \text{ml}) = 0.101 \pm 0.0017\ \mu\text{Ci}$. The average decontamination factor, DF, for the experiment is thus $705 \pm 131$.

To prepare the column for heating valves 111 and 114 were opened and when all liquid flow stopped valves 111 and 114 closed and diaphram pump 117 was shut off. With valves 115 and 126 open and all other valves closed and with columm roughing vacuum pump 120 operating, the column was vacuum dried at ambient temperature for 12 hours following which the temperature of the oven surrounding the column was programmed up to 1050° C. over a 36 hour period, held at 1050° C. for 1 hour and then allowed to return to ambient temperature at its normal cooling rate over a 12 hour period. During the heating period pump 121 was turned on to evacuate the furnace assembly. The oven-column assembly was then taken out of the water tank and the column removed from the oven.

Prior to heating, the activity detector outside the water tank gave an increasing count rate with time, which corresponded to the accumulation of activity within the column. After heating and disassembly, 73% of the total Cs-137 activity was determined to be in the sintered glass and 27% on the tube walls. Visual inspection of the sintered mixture showed it to be a glassy grey, rigid foam of limited porosity.

A sample of this material having a geometric surface area of approximately 2.66 cm³ was washed twice with deionized water, each time for a period of 10 minutes and was then placed in 100 ml. of de-ionized water in a Teflon vessel at 24° C. The leachant, (de-ionized water) was then completely removed and replaced with fresh de-ionized water at intervals of 1, 3, 6, 21, and 29 days. The matrix dissolution rate was calculated based on determination of the silica level in the used leachant by the reduced silicomolybdate spectrophotometric method. The dissolution rate dropped by a factor of 12 from the first day to the second day and by another factor of 3.1 from the second day to the 25th day. On the 25th day, the dissolution rate was slightly below $3 \times 10^{-7}\ \text{g cm}^{-2}\text{d}^{-1}$, a value which is three orders of magnitude better than the best cements and comparable to that of the borosilicate glass used in Europe for high level waste disposal.

EXAMPLE II

This example illustrates the use of a number of other powdered additives. The example is carried out in a fashion similar to Example I with variation in the type and amount of additive, sintering time and sintering temperature. Among the properties desirable in an additive are the following: (i) it must lower the sintering temperature of the ion exchange media and additive mixture enough to prevent sublimation of the radioactive substances trapped on the ion exchange media and/or deterioration of the column cannister; (ii) it must lower the viscosity of the mixture enough to allow sintering in a reasonable amount of time; (iii) it must not interfere with the ion exchange capacity and efficiency of the media; and (iv) it must form a highly durable monolith when sintered with the ion exchange media. As this example shows, the choice of additive will necessitate an optimization of the above properties. No single additive possesses all of the above properties to the highest degree.

The composition of Additives A–F is given in Table II. Some relevant physical properties are given in Table III.

TABLE III

| Additive | Sintering Temp (°C.) | Viscosity (poise) at Sintering Temp. | Viscosity (poise) at 1050° C. | Leach Rate (g cm$^{-2}$d$^{-1}$) |
| --- | --- | --- | --- | --- |
| A | 600 | $7 \times 10^5$ | $1 \times 10^2$ | $8 \times 10^{-6}$ |
| B | 1000 | $7 \times 10^5$ | $3 \times 10^5$ | $1 \times 10^{-7}$ |
| C | 726 | $7 \times 10^5$ | $1 \times 10^3$ | $5 \times 10^{-5}$ |
| D | | | $1.3 \times 10^2$ | $7 \times 10^{-6}$ |
| E | 590 | $1 \times 10^4$ | 1 | $5 \times 10^{-5}$ |
| F | 850 | $3 \times 10^5$ | $8 \times 10^4$ | |

Each of the additives was individually crushed and sieved to produce grains having particle sizes of 210 to 355 micrometers. The powdered additives were individually mixed with dried Medium X (prepared as in Example I) in the proportions given in Table I. The mixtures were then individually loaded into stainless steel columns and the ion exchange and sintering steps carried out as in Example I with the exception that the influent solution contained no radioactive tracer Cs-137. All concentrations were determined by AA/ES. After sintering, each tube was cut open and the results of sintering observed. The sintering performance was rated on a scale of 0 to 3 as given in Table I.

Additives containing large percentages of the low melting oxides of lead, bismuth, phosphorous, boron, alkaline earth metals or alkali metals are effective at lowering the sintering temperature, whereas additives containing large percentages of the high melting, refractory oxides of silica, aluminum and zirconium should be ineffective. The additives contained in this example confirm the above expectations. Additives B and F contain a large percentage of $SiO_2$ as well as some $Al_2O_3$. Both produce no sintering at or below 1050° C. Additive E is composed only of $B_2O_3$ and PbO. It produces excellent sintering at 1000° C. Additive A contains a relatively low percentage of $SiO_2$, a high percentage of PbO and alkali oxides ($Na_2O$, $K_2O$, $Li_2O$) and produces good sintering at 1050° C. The composition of Additive C is similar to that of A, but is somewhat lower in PbO and the alkali oxides, and higher in $SiO_2$. It produces medium sintering at 1050° C. Additive D has the lowest percentage of $SiO_2$ of the additives listed, and a relatively high percentage of $B_2O_3$ and alkali oxides ($Na_2$) and some alkaline earth oxides (CaO, BaO). It too produces good sintering at 1050° C. In terms of ability to reduce the sintering temperature, the additives of Table II must be rated E>A=D>C>F>B. This order parallels that produced by ordering the pure additives by their sintering temperatures as given in Table III (lowest E, A, C, F, B highest) or by their viscosities at 1050° C. (lowest E, A~D, C, F, B, highest).

None of the additives tested in this example appeared to interfere with the ion exchange properties of the ion exchange media except by dilution. Additives such as A, D and E which can give good sintering at low volume percents are to be preferred over others that produce good sintering only at large volume percents. Undoubtedly, even Additive B, if present at greater than 99 volume % would produce good sintering with Media X at 1050° C. Unfortunately, the ion exchange capacity of such a mixture would be almost nil.

If the additive is present during the ion exchange process, as in this example, the calculations given in the description of the invention show that its dissolution rate should be less than $10^{-4}$ g cm$^{-2}$d$^{-1}$ and preferably less than $10^{-5}$ g cm$^{-2}$d$^{-1}$. Ranking the additives tested in terms of dissolution rate we have: (lowest, B, A~D, E~C highest) making B the preferred additive in terms of durability. Additives B, A and D all have dissolution rates below the preferred value of $10^{-5}$ g cm$^{-2}$d$^{-1}$.

Available information on dissolution rates vs chemical composition indicates that $SiO_2$, $Al_2O_3$ and $ZrO_2$ increase durability (decrease dissolution rates) while alkali metal oxides and $B_2O_3$ decrease durability. It is thus expected that Additives B and F should have very good durability and impart good durability while Additive E should have poor durability and impart poor durability to the final monolith. The expectations are born out by Table II and by observations of the final monolith when tested as in Example I.

The final choice of powdered additive depends very much on the maximum sintering temperature which in turn depends on the sublimation temperature of radioactive species trapped on the ion exchange media and the maximum process temperature the cannister material can withstand. Once this temperature is determined, all additives that produce good sintering at that temperature should be examined, and the one with highest durability chosen. The following illustrations using the six additives in Table I may prove useful:

(A) If the maximum process temperature is 1250° C., all additives will give good sintering at this temperature, and Additive B will be chosen if 50 volume % additive is acceptable since it has the highest durability;

(B) If the maximum process temperature is 1050° C., Additives A, D, and E provide good sintering, and Additive A or D will be chosen since they have the highest durability; and (C) If the maximum process temperature is 950° C., Additive E will produce the best sintering, and Additive E should be chosen.

EXAMPLE III

This example serves to illustrate the use of two powdered additives, A and E, with an inorganic ion exchange media Y, Ionsiv IE95, presently used in nuclear waste water treatment. Ionsiv IE95 is a zeolite (sodium alumino silicate) produced by the Linde Division of the Union Carbide Corp., that is particularly effective for removing Cs from solution. By itself, it sinters at temperatures in excess of 1300° C. Therefore, for most applications, especially those involving entrapment of radioactive Cs, a sintering aid is required.

Additives A and E were individually crushed and sieved to produce grains having particle sizes of 210 to 355 micrometers. The powdered additives were individually mixed with dried Media Y (20×50 size as specified by the manufacturer). The final mixtures contained 30% additive in each case. The mixtures were then individually loaded into stainless steel columns and the ion exchange and sintering steps carried out as in Example I using the influent solution of Example II. No Cs was detected in the effluent during the course of the ion exchange process. Both mixtures were sintered at 1050° C. After sintering and cooling each tube was cut open and the sintering performance of each mixture rated as in Example II. In both cases the mixtures produced well sintered glasses with very little porosity and were given a performance rating of three. In this case, since both additives gave good sintering at 1050° C., Additive A is preferred because of its higher durability. This example could be repeated using radioactive Cs with similar results.

EXAMPLE IV

This example demonstrates the use of an additive, A, with an inorganic anion exchanger, Media Z which is prepared as follows: Rods of the alkali-borosilicate glass prepared as in Example I were cut into 3″ sections, then they were leached as in Example I for 24 hours and were washed. Six of these porous glass rods were immersed in an 11.7% $Zr(NO_3)_4.5H_2O$ aqueous solution at room temperature for 17 hours thus allowing the $Zr(NO_3)_4$ to diffuse inside the pores of the glass. The stuffed rods were then transferred to an oven at 100° C. for 1½ hours to evoke precipitation of the Zr salt by evaporation of the water. The rods were heated to 200° C. under vacuum to decompose the nitrate within the glass pores into zirconium oxide which hydrates in the presence of water to impart anionic exchange capability. It is believed that the hydrated zirconium atoms bonded to each other in the form of crystals and that some of the zirconium atoms are bonded to silicon of the glass rod through divalent oxygen linkages. The rods were then crushed and sieved to collect the 355–710 μm fraction. This material is ion exchange Media Z.

Ion exchange and sintering tests were carried out on a mixture of 20% Additive A and 80% Media Z according to the procedures in Example 1 with the following changes: (1) the influent solution was 1.0 ppm $CrO_4^{-2}$ ion (as $Na_2CrO_4$) and 1.0 ppm $MoO_4^{-2}$ ion (as $Na_2MoO_4$) in de-ionized water; (2) since no radioactive tracers were used, all analytical determinations were made using D.C. plasma emission spectroscopy; (3) analysis of the effluent solutions showed that over 90% of the $CrO_4^{-2}$ and $MoO_4^{-2}$ anions present in the influent had been absorbed on Media Z. This example could be repeated using radioactive Cr and Mo with similar results.

EXAMPLE V

Successful sintering requires that an intimate homogeneous mix of additive and ion exchange media be effected prior to sintering. Care must also be taken that no separation of the mixture occur during such steps as backwashing and ion exchange. The previous examples demonstrated that dry mixing of additive and media produces the required uniform, homogeneous mixture and that rigid confinement of the mixture between two porous discs prevents separation during backwashing and ion exchange. This example illustrates the problem of mixture separation during backflow operations and describes another technique to prevent it. This example also illustrates techniques that can be used to mix additive and ion exchange media in slurry form.

The following initial tests were carried out:

(i) Additive D having the composition set forth in Table II and a bulk density of 3.0 grams/cm$^3$ was ground and sieved to obtain particles within the size range of 350 to 550 micrometers. Five cm$^3$ of these particles was mixed in a slurry with 5 cm$^3$ of ion exchange Media X prepared as in Example I which had a bulk density of 1.7 grams/cm$^3$. The mixture was then placed in a transparent, plastic column having a cross sectional area of 0.89 cm² and backwashed by passing a stream of deionized water from the bottom to the top of the column at the rate of 43 cm³/min. for 5 minutes. Upon completion of the backwash step, it was observed that the additive (black in color) remained at the bottom of the column while the ion exchange medium (white) had risen to the top of the column.

(ii) Five cm³ of an ion exchange Media X prepared as in Example I was soaked in a solution of cobalt ion Co$^{+2}$ (100 ppm Co(NO$_3$)$_2$). The resulting blue media, in slurry form, was mixed with 5 cm³ of Additive A having the composition set forth in Table II which had a bulk density of 3.84 grams/cm.³ and particle size ranging from 177 to 250 micrometers. Once again the additive and the ion exchange medium separated with the additive remaining in the bottom of the column while the ion exchange medium had risen to the top.

(iii) Five cm³ of ion exchange Media X made as in Example I and having a wet bulk density of 1.7 grams/cm³ and 5 cm³ of Additive D having the composition defined in Table II, a bulk density of 3.0 grams/cm³ and particle sizes within the range of 125 to 355 micrometers was placed into a column having a cross sectional area of 0.89 cm². As originally placed in the column, ion exchange media and additive were not uniformly mixed. The column was then backwashed with de-ionized water at the rate of 40 cm³/min. for 5 minutes. A slight amount of Additive D was observed at the top of the column at the conclusion of the backwash operation, but otherwise the ion exchange media and the additive were uniformly mixed in the column.

(iv) Five cm³ of ion exchange Media X prepared as in Example I was soaked in a solution of cobalt ion (Co$^{+2}$ as in (ii)). The resulting blue ion exchange media, in slurry form, was mixed with 5 cm³ of Additive A having the composition defined in Table II, a bulk density of 3.84 grams/cm³, and particle sizes within the range of 90–125 microns, and placed in a column as above. After 5 minutes of backwash at the rate of 40 cm³/min., the mixture was uniform with little or no separation of media and additive.

Each of the four mixtures given in Table IV was prepared. Note that these mixtures parallel the four tested above in the transparent plastic column.

TABLE IV

| Mixture | Media | Media Size (μm) | Additive | Additive Size (μm) | Volume % Additive |
|---|---|---|---|---|---|
| 1 | X | 355–710 | D | 350–550 | 50 |
| 2 | X | 355–710 | A | 177–250 | 50 |
| 3 | X | 355–710 | D | 125–355 | 50 |
| 4 | X | 355–170 | A | 90–125 | 50 |

Each mixture was loaded in a stainless steel tube as in Example I. This time, however, the second filter disc was not placed in the column on top of the mixture, thus allowing the mixture to expand during backwash. Each column was backwashed at a rate of 40 cm³/min for 5 minutes prior to ion exchange. Ion exchange and sintering was then carried out as in Example I with the exception that no Cs-137 tracer was used, all concentrations were determined by AA/ES. After cooling each tube was cut open and the results of sintering observed. Mixtures 1 and 2 had evidently separated during the backwashing process. The additive at the bottom of the mixture had sintered very well. However, the ion exchange media had not sintered at all. Mixtures 3 and 4 evidently had not separated during backwashing and were well sintered (performance index 3).

This example illustrates that careful selection of the media and additive particle size according to the guideline given in the description of the invention vis:

$$\rho_A S_A^{\frac{1}{3}} = \rho_M S_M^{\frac{1}{3}}$$

where $\rho$ is the bulk density, $S$ is the particle size and $A$ and $M$ stand for additive and ion exchange media respectively, can prevent separation during counter-flow operations such as backwashing. The example also shows that given the proper choice of particle sizes, counter-flow operations can actually promote uniform mixing.

EXAMPLE VI

This example illustrates another method of preventing separation of the additive and media. The mixture separation is prevented by modifying the backwash procedure in one of two ways (i) Four cm³ of the ion exchange Media X which had previously been soaked in a cobalt (Co$^{+2}$) solution as in Example V and then dried, and 1 cm³ of Additive A having particle size in the range of 177 to 250 micrometers was mixed and then loaded dry into a glass column having a cross sectional area of 0.95 cm². No separation of additive and media was observed. In order to remove air pockets from the mixture which would cause "channeling" during forward flow operation, the mixture was gently backwashed at a rate of 1 ml/min. with water. During backwash the mixture did not expand and no separation of the mixture was observed. (ii) A mixture of ion exchange Media X and Additive A is prepared and loaded in a column as in (i) above. Air pockets in the mixture are removed by evacuating the column and then gently sucking water into the column. No separation of ion exchange media and additive occurs.

A mixture of 80 vol % Media X and 20% Additive A (particle size 177 to 250 μm) was loaded into a stainless steel tube as in Example V. The backwash rate was changed to 1 ml.min. as in (i) above. After the backwash the example proceeded as Example V through sintering. Inspection of the mixture after sintering showed a well sintered product with no evidence of mixture separation. Examination of the effluent concentrations gave no evidence of channeling during the ion exchange process since capacity and DF figures were similar to those in Example I.

The procedure in the above paragraph was repeated with the backwash modified as in (ii). The results were identical to those obtained above. Thus, slowing down or eliminating back flow operations can prevent mixture separation.

EXAMPLE VII

This example demonstrates the introduction of the additive in liquid form after the ion exchange process has taken place. This method of introduction of the additive avoids the dilution of the ion exchange media by additive during the ion exchange process. It also eliminates the possibility of interference by the additive with the ion exchange capacity or efficiency of the ion exchange media. Finally, it leaves the additive behind as a uniform coating on the media or as a powder uniformly mixed with the ion exchange media.

Liquid additives are produced by dissolving a suitable sintering aid in a solvent which can subsequently be evaporated cleanly leaving the sintering aid behind. After the ion exchange process is completed the ion exchange media is dried and enough liquid additive introduced to cover the ion exchange media. The solvent is then evaporated leaving the aid behind. This process can be repeated several times to increase the amount of aid deposited in the ion exchange media.

A number of liquid additives are given in Table V.

TABLE V

| Liquid Additive | Solvent | Liquid Additive Composition/100 ml. soln |
|---|---|---|
| H | 1.3 molar NH$_4$OH (aqueous) | 18 g H$_3$BO$_3$ |
| I | Methanol | 18.2 g H$_3$BO$_3$ |
| J | 5.8 molar NH$_4$OH (aqueous) | 20.8 g H$_3$BO$_3$ + 10.4 g Zn(OH)$_2$ |
| K | 8.2 molar NH$_4$OH (aqueous) | 20 g H$_3$BO$_3$ + 26 g CoCl$_2$.6H$_2$O |
| L | Water | 41 g Pb(C$_2$H$_3$O$_2$)$_2$.3H$_2$O |
| M | Hot water (70° C.) | 69 g Pb(C$_2$H$_3$O$_2$)$_2$.3H$_2$O |
| N | Methanol | 12.1 g H$_3$BO$_3$ + 38 g Mg(NO$_3$)$_2$.6H$_2$O |
| O | Water | 52 g Pb(NO$_3$)$_2$ |
| P | 17 molar acetic acid | 86.4 g Bi(NO$_3$)$_3$.5H$_2$O |

Ion exchange Media X is prepared as in Example I. It is then placed in an ion exchange column consisting of a 304 stainless steel tube similar to that used in Example I but with a small dead volume below the bottom frit. Five cm$^3$ of ion exchange media is placed in the tube on top of the bottom frit and a second frit is forced down on top and held in place by a second clip. The column is then placed in the tubing and furnace system as in Example I. The column is then backwashed and influent similar to Example I passed through the column as in Example I. After the flow of influent stopped the system was sampled and vacuum dried for 12 hours as in Example I. All valves were then closed. Reservoir 112 was then filled with liquid additive H and pump 117 turned on. Valves 111, 126 and 105 were opened and enough of the liquid Additive H was sucked up into the column to just cover the top frit. Valves 111, 126, and 105 were then closed and the system pumped on by opening valves 104 and 115 for 24 hours, evaporating the solvent in liquid Additive H. The furnace was evacuated and the temperature then raised at 1° C./minute to 1050° C. and held there for 1 hour, thus sintering the glass to form a clear homogeneous foam glass that has trapped the radioactive Cs.

A sample of the glass was tested for durability as in Example I with leachant (deionized water) replacement taking place at 2, 5, 16, 23, 30 and 37 days. The matrix (silica) dissolution rate after 37 days was $5.3 \times {}^{-7}$ g.cm$^{-2}$.d$^{-1}$. This dissolution rate compares favorably with that of the borosilicate glass presently used in Europe for high level waste disposal.

EXAMPLE VIII

In this example, eight liquid additives (I-P of Table VI) are tested. The example is identical to Example VII except that Additives I-P were individually used in place of Additive H and that the influent contained no Cs-137 tracer. All Cs concentrations were determined by AA/ES.

The results of the sintering process are given in Table VI.

TABLE VI
Effectiveness of Liquid Additives

| Liquid Additive | Result of Sintering |
|---|---|
| H | Clear homogeneous foam glass produced. |
| I | Black polycrystalline foam produced. Charcoal like consistancy. |
| J | Clear homogeneous foam glass produced. |
| K | Grainy foam produced. Blue (cobalt) not uniformly distributed. |
| L | Black glassy material produced which powders easily. |
| M | Black glassy material produced. Powders easily with small beads of metal present. |
| N | Black crystalline material produced which powders easily. |
| O | White grainy foam glass produced. Not homogeneous which powders easily. |
| P | Grainy glass produced which powders easily. |

The liquid additives using methanol for a solvent (I and N) gave poor end products that were black and powdered easily. The color and mechanical weakness are probably caused by carbon from methanol that was not removed prior to sintering. This problem may possibly be overcome by more careful evaporation of the solvent (i.e., longer times and/or slower heating rates). It may also be ion exchange media dependent and may not be a problem with other ion exchange media. A similar poor end-product was produced when Pb(C$_2$H$_3$O$_2$)$_2$ 3H$_2$O was used as the Additive (L, M), and probably results from carbonization of the acetate (C$_2$H$_3$O$_2$). This problem may also possibly be overcome by altering the evaporation or heating process. The additives containing H$_3$BO$_3$ in aqueous NH$_4$OH (H, J and K) produced good end products which were foams with non interconnected pores. As noted with the solid additives, B$_2$O$_3$/H$_3$BO$_3$ is an excellent sintering aid. However, it can not be used alone as a solid additive because of its poor chemical durability. The Pb and Bi nitrate additives (O, P) seem to produce mechanically weak foams which are poor end-products. Samples produced using liquid additives J, K and L were tested for durability as in Example VII. The matrix (silica) dissolution rates after 37 days are listed in Table VII.

TABLE VII

| Liquid Additive | Matrix Dissolution Rate ($\mu$g cm$^{-2}$day$^{-1}$) |
|---|---|
| J | 5.37 |
| K | 1.30 |
| L | 2.73 |

As can be seen, the durability of each product is quite high.

As will be readily understood by those of ordinary skill in the art, minor modifications may be made in the process and apparatus described above without in any way departing from the spirit and scope of the invention. Accordingly, it is understood that the invention will not be limited to the exact details disclosed hereinabove, but will be defined in accordance with the appended claims.

What is claimed is:

1. An ion exchange composition comprising a non-radioactive inorganic ion exchange medium for radioactive ions and an additive therefor, said ion exchange medium being selected from the group consisting of:
   (i) porous silicate glass or porous silica gel;
   (ii) natural or synthetic clays;
   (iii) hydrated metal oxides;

(iv) the alkali salts of said hydrated metal oxides, and
(v) mixtures of (i)–(iv);
said ion exchange medium having a sintering temperature above about 1300° C., said additive being a sintering aid for said ion exchange medium and permitting said composition to be sintered at a temperature below about 120° C., said additive being substantially incapable of ion exchange with said ion exchange medium and having a chemical durability represented by a leach rate of less than about $10^{-4}$ gm/cm$^2$/day.

2. A composition according to claim 1 wherein the additive is selected from the group consisting of alkali metal oxides, alkaline earth metal oxides, $SiO_2$, $B_2O_3$, PbO, $P_2O_5$, $Bi_2O_3$, $Nd_2O_3$, $Fe_2O_3$, ZnO, $TiO_2$, $MoO_3$, $ZrO_2$, $CoO_3$ and mixtures thereof.

3. A composition according to claim 1 containing from about 50 to about 90 volume percent ion exchange medium and from about 10 to about 50 volume percent additive.

4. A composition according to claim 1 wherein the product of the bulk density and square root of the particle size of the ion exchange medium and additive are approximately equal.

5. A composition according to claim 1 wherein said composition has a sintering temperature of below about 1050° C.

6. A composition according to claim 1 wherein said ion exchange medium is a porous silicate glass characterized by having an interconnected porous structure and having at least about 75 mole percent $SiO_2$ on a dry basis.

7. A composition according to claim 1 wherein said hydrated metal oxide is selected from the group consisting of aluminum oxide, titanium oxide, zirconium oxide and thorium oxide or mixtures thereof.

8. A composition according to claim 1 wherein said composition is a homogeneous mixture of said ion exchange medium and additive.

9. A composition according to claim 1 wherein said additive has a chemical durability represented by a leach rate of less than about $10^{-5}$ gm/cm$^2$/day.

10. A composition according to claim 1 wherein said additive has a viscosity below about $10^3$ poise at 1050° C.

11. The composition according to claim 1 wherein said additive has a viscosity below about $10^2$ poise at 1050° C.

12. A composition according to claim 1 wherein said additive contains PbO.

* * * * *